United States Patent [19]

Stevens

[11] 3,939,544

[45] Feb. 24, 1976

[54] ASSEMBLY MACHINE HAVING IMPROVED TOOLING MOUNTING

[75] Inventor: Donald Stevens, Erie, Pa.

[73] Assignee: Assembly Machines, Inc., Erie, Pa.

[22] Filed: Jan. 24, 1975

[21] Appl. No.: 543,678

[52] U.S. Cl. .............. 29/208 F; 29/33 K; 29/33 R; 29/200 R; 29/208 R; 29/208 C
[51] Int. Cl.$^2$ .......................................... B23P 19/04
[58] Field of Search .......... 29/200 R, 200 P, 208 R, 29/208 C, 208 F, 211 R, 33 R, 33 K, 33 J, 33 P, 33 Q

[56] References Cited
UNITED STATES PATENTS

| | | | |
|---|---|---|---|
| 2,962,846 | 12/1960 | Marindin ............................ | 29/208 F |
| 3,065,530 | 11/1962 | Merchant et al. ................. | 29/208 F |
| 3,143,792 | 8/1964 | Swanson et al. .................... | 29/208 F |
| 3,591,913 | 7/1971 | Lewis ................................ | 29/208 F |

*Primary Examiner*—Victor A. DiPalma
*Attorney, Agent, or Firm*—Robert D. Yeager; Howard G. Massung

[57] ABSTRACT

An assembly machine is provided having tooling mounting and surfaces and tooling actuator drivers above and below a rotatable assembly table. The annular assembly table is disposed around a main center support column within which is disposed the main driver shaft. An indexing unit rotates the annular assembly table in discrete spaced apart steps around the main support column. A lower tooling plate mounting surface and a tooling actuator driver, which is driven from the main drive shaft, is provided beneath the annular assembly table. The mounting surface is fixed longitudinally with respect to the annular assembly table while the tooling driver reciprocates with respect to the assembly table. An upper tooling mount is provided above the annular assembly table. The upper annular tooling mount is disposed around the main center support column and moves in a reciprocating up-/down motion with respect to the annular assembly table. Tooling for performing various operations on devices to be assembled which are mounted on the assembly table can be connected to the upper tooling mount. An upper actuator driver is provided above the upper tooling mount and the lower actuator driver is provided beneath the annular assembly table. An actuator is provided for transmitting power from the upper actuator driver to tooling mounted on the upper tooling mount. An actuator is also provided for transmitting power from the lower actuator driver to the tooling mounted on the lower mounting plate. The upper and lower actuator drivers move in reciprocal up and down motion along the main center support column. Self-aligning roller assemblies are utilized on the lower driver, the upper tooling mount and the upper actuator driver for spacing these devices away from the main center support column and providing for easy longitudinal movement along the main center support column. The roller assemblies include a nylon roller which can move easily along the main center support column. The roller assemblies can be removed from the outside of the assembly machine without disassembling any other portion of the assembly machine. Rotational movement of the upper actuator driver, the lower actuator driver and the upper tooling mount is prevented. The main center drive shaft is disposed within the main center support column. This is driven by appropriate drive assemblies. Various cam and cam follower arrangements are provided between the main center drive shaft and the upper actuator driver, the lower actuator driver and the upper tooling mount to move the upper actuator driver, the lower actuator driver and the upper tooling mount in a reciprocal up and down motion which is a function of the selected cam and cam follower assembly. The roller assemblies which can be attached externally to the upper actuator driver, the lower actuator driver and the upper tooling mount serves to accurately align these items around the main center support column.

17 Claims, 31 Drawing Figures

TYPICAL MACHINE CYCLE

ASSEMBLY MACHINE HAVING IMPROVED TOOLING MOUNTING

CROSS REFERENCE TO RELATED APPLICATIONS

This application is related to copending application Ser. No. 543,677 filed Jan. 24, 1975 and copending application Ser. No. 543,679 filed Jan. 24, 1975.

BACKGROUND OF THE INVENTION

1. Field of the Invention

This invention relates to assembly machines and more particularly to an assembly machine, adapted to assemble articles formed from several parts, having a positive positioning mechanism.

2. Description of the Prior Art

Assembly machines of the variety disclosed herein are particularly suitable for assembly of an article made from a plurality of relatively small parts. Assembly machines operate at a relatively high speed. During assembly of an article a portion of the article is fed onto a movable assembly table. The article is positioned at a station on the assembly table. The assembly table is then indexed, so that the article is moved to a work station where any of a number of operations can occur such as: adding additional components, drilling, taping, screwing, reorienting, testing, removing, or any other desired operation. After a slight time delay the assembly table is again indexed so that the article moves to successive work positions where all the required operations are performed. At any time numerous articles in various states of assembly will be located on the assembly table. The article can be fed onto and removed from the assembly table by any of a variety of means well known in the prior art. It can readily be appreciated, that, since all operations on the article to be assembled must be coordinated with the location of the work stations, during the dwell portion of the machine cycle, it is highly desirable that the work stations location be determined with a high degree of accuracy. That is, the various tooling is set to perform a predetermined operation on the article when it is at a given work position. If the article is not at the correct position, machine jams or damage to the article can occur. Exact high speed positioning becomes especially critical as the assembly speed is increased.

The assembly machine can have a rotatable assembly table with the stations spaced around the outer perimeter of the table. Various assembling and finishing operations can be performed on the article positioned in the station as the rotatable assembly table is indexed, in steps, around the machine. The articles can be loaded onto the assembly table by means of the well known vibratory bowl feeders, manually, or by other suitable means.

Assembly machines having an annular assembly table, which can be rotated around a main center support column, are well known in the art. U.S. Pat. No. 3,065,530 to Merchant et al. and U.S. Pat. No. 3,231,968 to Swanson exemplify prior art assembly machines having a rotatable assembly table. An indexing unit moves the assembly table of the machine at intervals or steps around the center supprt column. The stations, containing the article, are stopped at the work positions during indexing steps. During these dwell portions of the machine cycle, the required operations are performed on the article. A problem frequently encountered with the prior art units is that the indexer, due to misalignment, wear or faulty operation, does not positively position the assembly table with the required degree of accuracy. This can lead to damaged parts, jams and production interruptions. It is desirable to have a positioning system which positively and accurately positions the assembly table with a high degree of accuracy during the dwell portion of each machine cycle.

Due to positioning, wear and alignment problems prior art assembly machines, requiring a high degree of positioning accuracy, are not provided with an overload mechanism between the indexer and assembly table.

Prior art assembly machines having an annular assembly table, rotatable around a main center support column containing a drive shaft are not provided with tooling mounts and tooling drivers above and below the annular assembly table. It is very desirable to have tooling mounts with power take-off above and below the assembly table for the additional flexibility provided.

SUMMARY OF THE INVENTION

An assembly machine is provided having an annular assembly table with tooling mounting surfaces and tooling drivers provided above and below the rotatable assembly table. A main center support column is provided around which the annular rotatable assembly table is disposed. The assembly table is supported from the main center support column. An indexing unit is provided which indexes the rotary assembly table in steps. The assembly table is longitudinally fixed with respect to the main center support column. An upper tooling mount is provided which is disposed around the main center support column for relative reciprocating longitudinal movement. An upper actuator driver is provided disposed around the main center support column for longitudinal reciprocating movement with respect to the upper tooling mount and the annular assembly table. Actuators can be used for transmitting power from the actuator driver to tooling mounted on the upper tooling mount. This tooling can perform various functions on articles to be assembled which are mounted on the rotary assembly table. A lower tooling mount is provided beneath and spaced apart from the assembly table. A lower actuator driver, for transmitting power to the tooling, is disposed around the main center support column between the assembly table and the lower tooling mount. The lower actuator driver is supported for reciprocal movement along the longitudinal axis of the main center support column. The lower actuator driver is connected by an actuator to tooling which can be mounted on the lower tooling mount. The lower tooling mount is relatively fixed longitudinally with respect to the annular assembly table. The reciprocating motion of the lower actuator driver is utilized for transmitting power to the appropriate tooling which is spaced on the lower tooling mount around the assembly table.

The upper actuator driver, the lower actuator driver and the upper tooling mount all move longitudinally along the main center support column. Self-aligning roller assemblies are utilized for aligning the upper actuator driver, the lower actuator driver and the upper tooling mount with respect to the main center support column. Each roller assembly comprises a nylon roller which contacts the main center support column and spaces the associated casting therefrom. A plurality of roller assemblies are disposed around the items which are to move longitudinally along the main center support column. These roller assemblies which can be attached from outside of the associated item, provide for self aligning of the item and permit easy longitudinal movement. The roller assemblies can be removed from the outside of the assembly machine without removing the associated upper actuator driver, lower actuator driver, or upper tooling mount from the main center support column. This construction provides for easy maintenance and fast and reliable alignment of the upper actuator driver, the lower actuator driver, or the upper tooling mount with respect to the main center support column.

A main center support shaft can be disposed in the main center column to be driven by an appropriate drive. Cams are disposed on the main drive shaft which controls the movement of an associate cam follower attached to the upper actuator driver, the lower actuator driver or the upper tooling mount to move the associated device in a reciprocating motion as the main center shaft rotates. An indexing unit is provided for moving the assembly table in discrete steps which are synchronized with the rotation of the main drive shaft. A positive positioning mechanism for engaging the assembly table when the index unit is not rotating the assembly table is provided. This positive dial positioning mechanism positions the assembly table to a high degree of accuracy during the dwell portion of each machine cycle.

The actuator which is provided for driving the appropriate tooling from the upper actuator driver or the lower actuator driver is provided with an overload device which provides overload protection when the actuator is driven in any direction. That is, as the actuator driver moves in a reciprocating up/down direction, the actuator moves in a radially in or out direction with respect to the main support column. The output of the actuator is connected to appropriate tooling which performs the desired functions on articles to be assembled which are disposed on the annular assembly table. As the actuator is moved in or out, overload protection is provided so that if an obstacle is encountered as the actuator moves in either direction, the actuator driver will be disconnected from the tooling.

An overload slip clutch is provided between the indexer and the annular assembly table. This is possible since the assembly table is positioned with a high degree of accuracy independent of wear in the slip clutch or indexer by the dial positioning mechanism. An overload limit switch is provided which is activated when the indexer slip clutch limit switch operates. The overload limit switch disconnects drive power from the assembly machine.

It is an object of this invention to disclose an assembly machine having a rotatable assembly table with tooling mounting surfaces and tooling drivers provided above and below the assembly table.

It is a further object of this invention to teach an assembly table which utilizes reciprocating members mounted to the main center support column for driving and operating various tooling wherein the reciprocating members are supported by self aligning externally attachable rollers.

BRIEF DESCRIPTION OF THE DRAWINGS

For a better understanding of the invention, reference may be had to the preferred embodiments exemplary of the invention shown in the accompanying drawings, in which.

DESCRIPTION OF THE PREFERRED EMBODIMENTS

Figure 1:
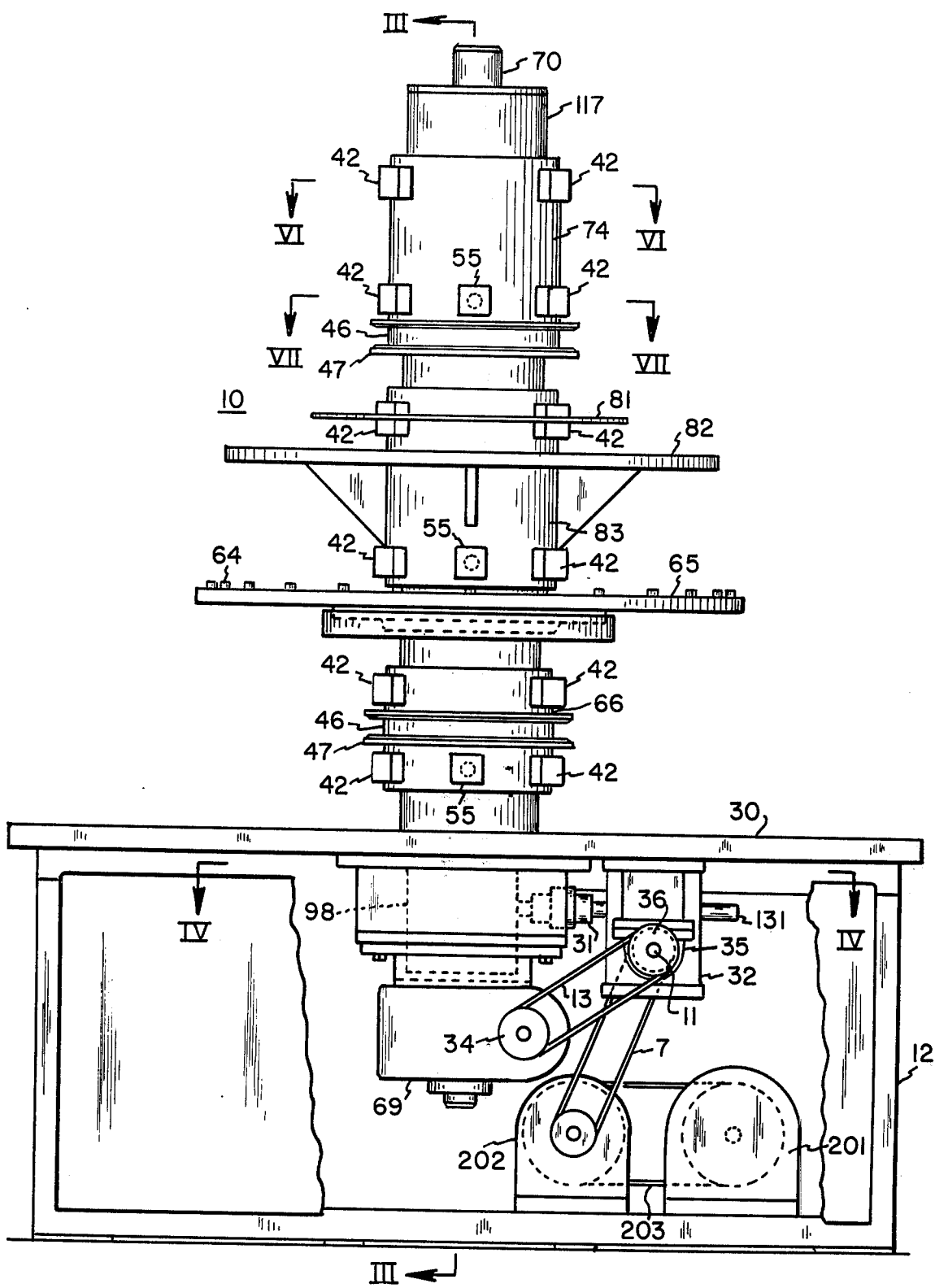
FIG. 1 is a front elevation view of an assembly machine utilizing the teaching of the present invention, with portions broken away for clarity.
Figure 2:
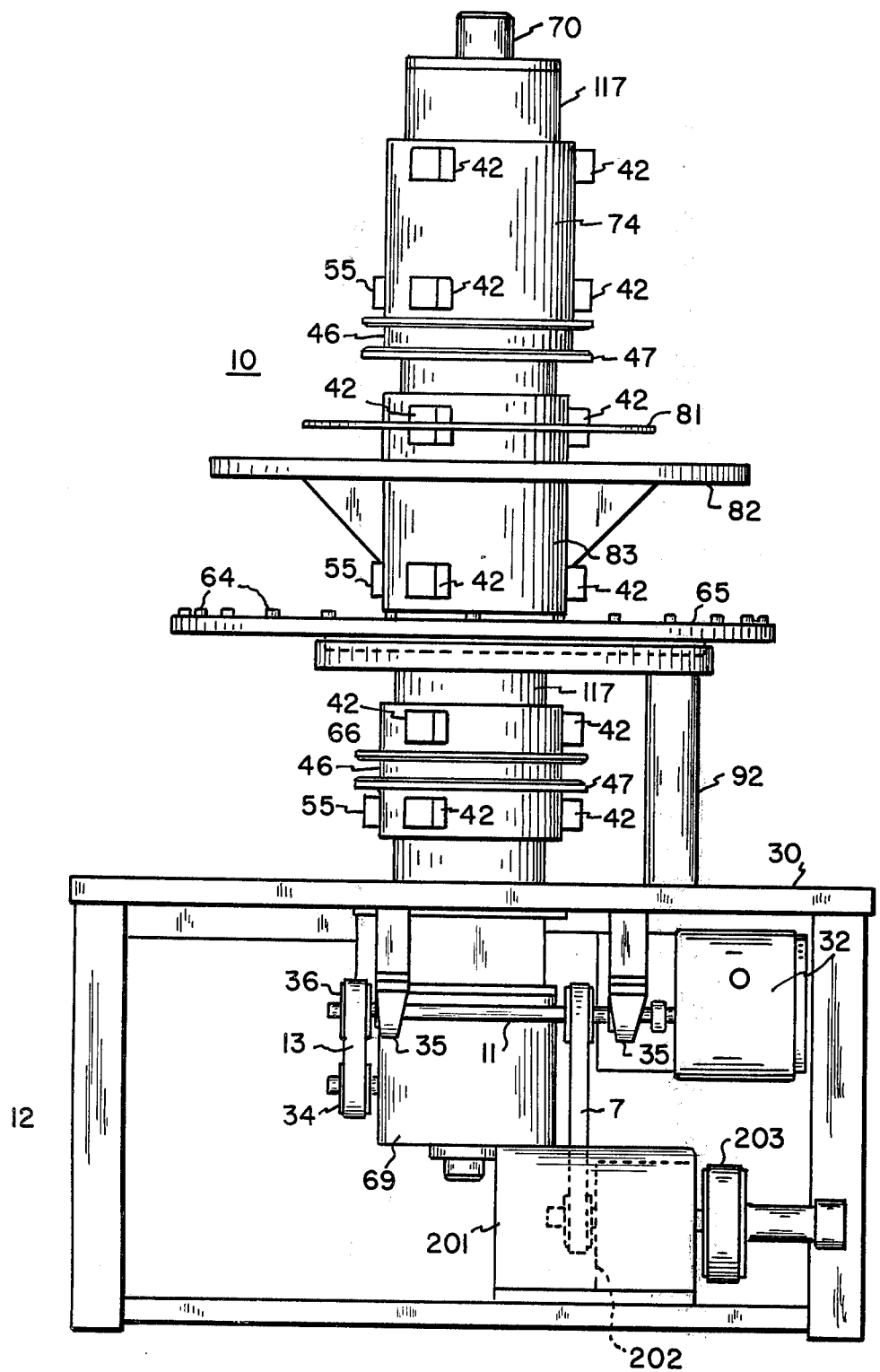
FIG. 2 is a right side elevation view of the assembly machine shown in FIG. 1.
Figure 3:
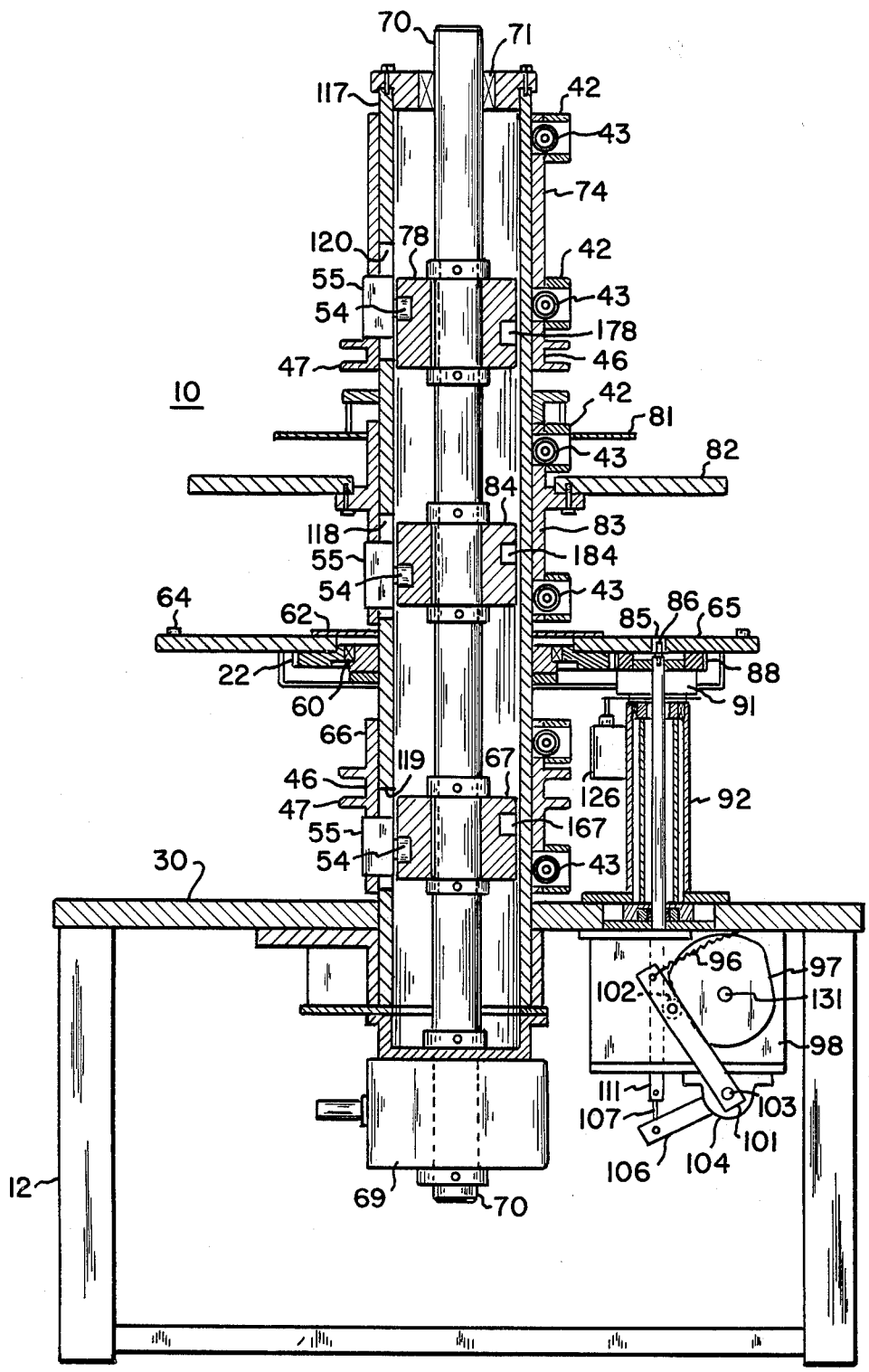
FIG. 3 is a sectional view of the assembly machine shown in FIG. 1 along lines III—III.
Figure 4:
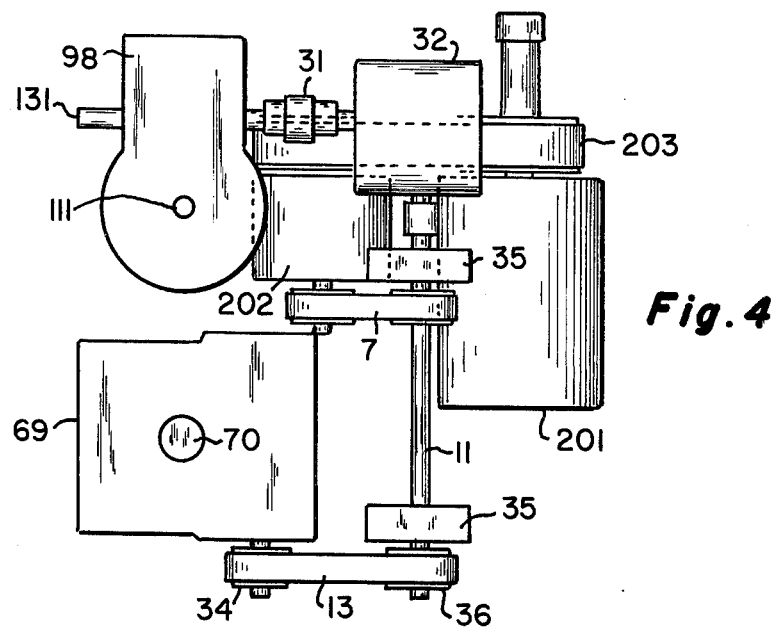
FIG. 4 is a sectional view of a portion of the assembly machine shown in FIG. 1 along lines IV—IV.
Figure 5:
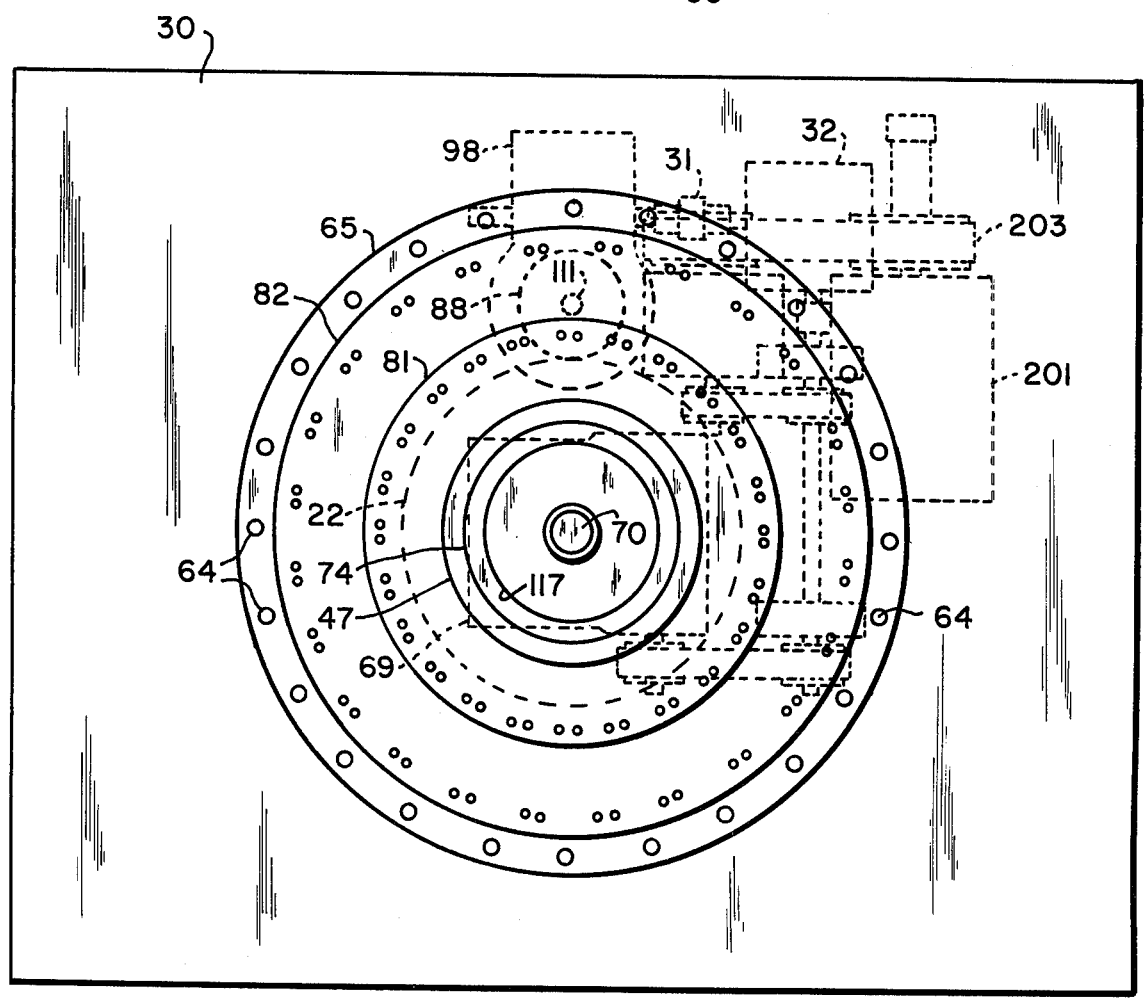
FIG. 5 is a top view of the assembly machine shown in FIG. 1.

Referring now to the drawings and FIGS. 1 through 5 in particular, there is shown an assembly machine 10 utilizing the teaching of the present invention. Power is supplied to the assembly machine 10 from an electric motor 201 which can be activated by an operator or other system control. Motor 201 is connected to a conventional clutch-brake device 202 by a drive belt 203. When the motor 201 is running the clutch-brake, 202 can connect or disconnect drive power for assembly machine 10. The output of the clutch brake 202 controls a drive shaft 11 through drive belt 7. Drive shaft 11 is rotatably supported by pillow block bearings 35 which are supported from the lower tooling plate 30. Drive shaft 11 which is rotatably supported by pillow block bearings 35 has a gear reducer 32 connected to one end and a drive pulley 36 connected to the other end thereof. The output of gear reducer 32 is connected by coupling 31 to shaft 131 which drives indexing unit 98 and dial locating system 100, whose operation will be described hereinafter in detail.

Assembly machine 10 includes a rotatable turret or annular assembly table 65 which is rotated at intervals by indexing unit 98 to move in steps around center column 117. Assembly table 65 has a plurality of assembly fixtures 64, mounted thereto for receiving components of the device to be assembled. The pins 64 are representative of fixtures, and any desired nest or fixture can be attached to assembly table 65. Tooling is connected to the lower tooling plate 30 and the upper tooling plate 82 for performing various operations on the device being assembled as assembly table 65 is indexed around center column 117. Power to activate the tooling is derived from main shaft 70.

Main shaft 70 is supported vertically within the assembly machine 10. Main shaft 70 is directly connected to the output of main shaft gear reducer 69. The input of main shaft gear reducer 69 is driven by timing drive belt 13 through pulley 34. Timing drive belt 13 is driven by drive pulley 36 which is connected to drive shaft 11. Drive belt 13 is a timing belt so that the pulley 34 can be driven in synchronism with pulley 36. Main shaft gear reducer 69 must be kept in synchronism with reducer 32 so that mechanical synchronization of the machine is maintained.

Figure 15:
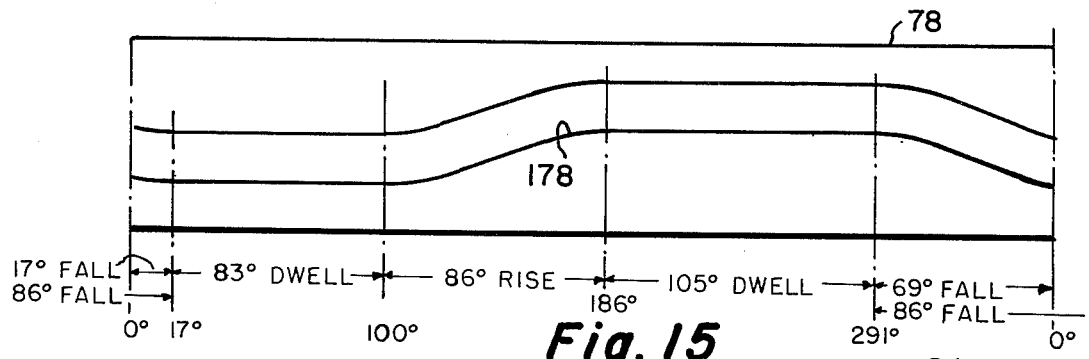
FIG. 15 is a flat projection of the upper actuator cam development.
Figure 16:
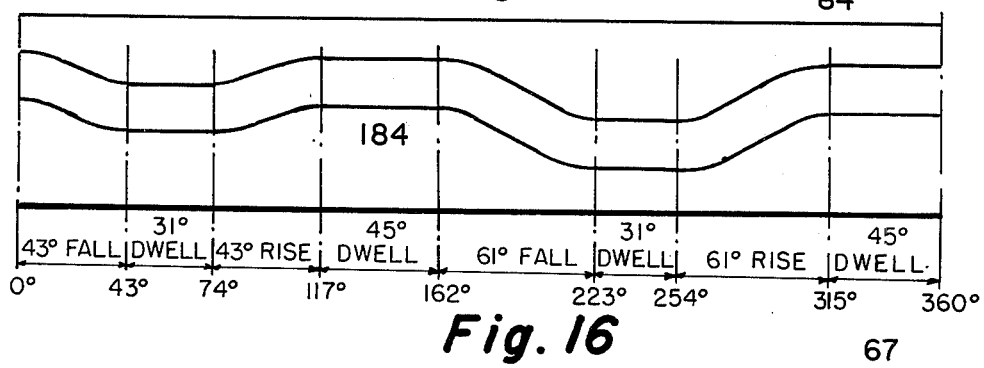
FIG. 16 is a flat projection of the upper tool plate cam development.
Figure 17:
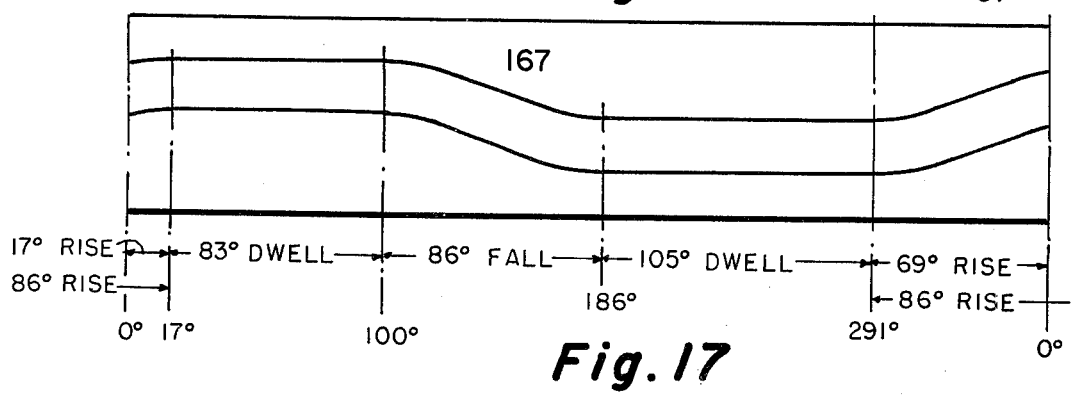
FIG. 17 is a flat projection of the lower actuator cam development.

Main shaft 70 is rotatably supported in a vertical alignment within the assembly machine 10. A main bearing assembly 71, disposed near the top of assembly machine 10, maintains main shaft 70 in vertical alignment. A main center column 117 within which is disposed the main shaft 70 is supported from lower tooling plate 30 and the main support frame 12. Various tooling, which can be mounted to lower tooling plate 30 and the upper tooling plate 82, derives its power from the main shaft 70. Main shaft 70 rotates one turn for each assembly machine 10 cycle. Rigidly connected to main shaft 70 to rotate therewith are upper actuator cam 78, upper tooling plate cam 84 and lower actuator cam 67. Cams 78, 84 and 67 have cam grooves 178, 184 and 167 formed therein, respectively. A flat projection of the upper actuator cam development is shown in FIG. 15. A flat projection of the development of upper tool plate cam 84 is shown in FIG. 16. A flat projection of the development of lower actuator cam 67 is shown in FIG. 17. An upper actuator driver 74 is mounted concentric with center column 117. Upper actuator driver 74 is supported so as to be movable in a reciprocating direction, but not to be able to rotate. Slot 120 acting against wear strips on cam follower assembly 55 prevents rotation of upper actuator driver 74. Cam follower assembly 55 engages the cam groove 178 cut into upper actuator cam 78. As upper actuator cam 78 rotates due to the rotation of main shaft 70, the upper actuator driver 74 moves in an up and down reciprocating motion which is dependent on the groove 178.

The upper tooling plate support 83 is also disposed coaxial with and around center column 117. Upper tooling plate support 83 is supported for reciprocating motion. Upper tooling plate support 83 is prevented from rotating by slot 118 formed in center column 117 which engages a bronze wear plate 50 of the cam follower assembly 55 which is attached to upper tooling plate support 83. Cam follower assembly 55 is rigidly connected to upper tooling plate support 83 so that the reciprocating motion of upper tooling plate support 83 is dependent on the groove 184 cut into upper tooling cam 84.

A cam follower assembly 55 is rigidly connected to lower actuator driver 66 to move lower actuator driver 66 in a reciprocating up/down motion which is dependent on the groove 167 cut into lower actuator cam 67. Lower actuator driver 66 is supported for up and down reciprocal motion but is prevented from moving in a rotational direction around center column 117. Roller 54 which forms part of cam assembly 55 rides in groove 167 to move lower actuator driver 66 in accordance with groove 167 cut into cam 67. Slot 119 acting against a wear plate on cam follower assembly 55 prevents rotary motion of the lower actuator driver 66.

Figure 6:
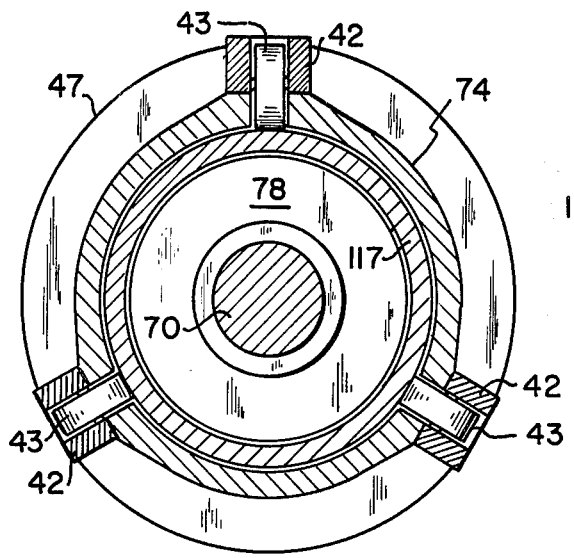
FIG. 6 is a section view of the assembly machine shown in FIG. 1 along lines VI—VI.
Figure 7:
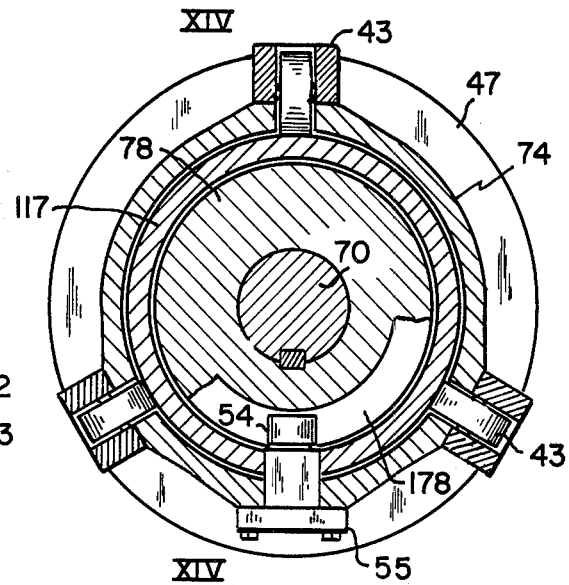
FIG. 7 is a sectional view of the assembly machine shown in FIG. 1 along lines VII—VII.
Figure 8:
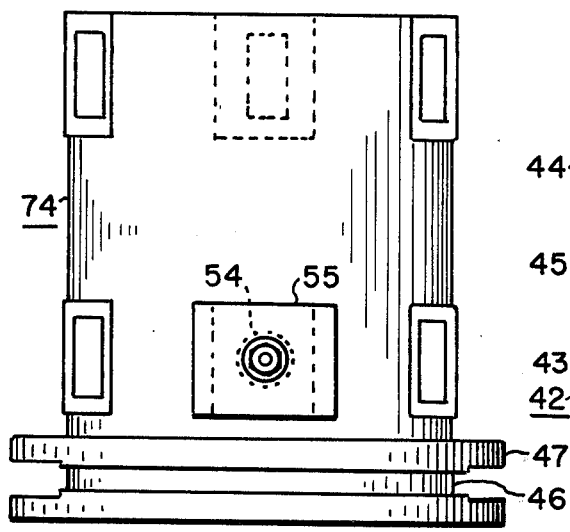
FIG. 8 is a front elevation view of the upper actuator driver.
Figure 9:
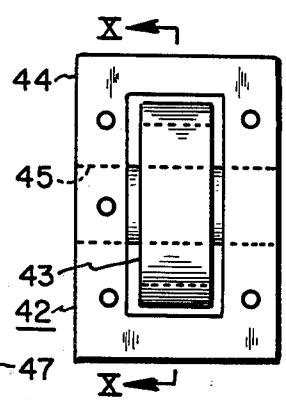
FIG. 9 is a front view of the guide roller mount utilized on the disclosed assembly machine.
Figure 10:
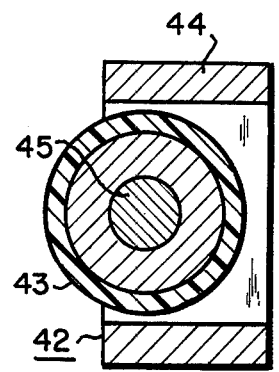
FIG. 10 is a sectional view of the guide roller mount shown in FIG. 9 along lines X—X.

A plurality of guide roller mounts are connected around the periphery of upper actuator driver 74, upper tooling plate support 83 and the lower actuator driver 66. Guide roller mount assembly 42, as best can be seen in FIGS. 6 and 7 are attached to their associated parts 66, 74 or 83 at approximately 120° intervals. Guide roller mount 42 provides a guide wheel 43 which contacts the center column 117 and provides for proper spacing and easy relative movement of the associated part 74, 83 or 66. The nylon guide roller 43 is rotatably supported in a mounting bracket 44 on shaft 45. Mounting bracket 44 is constructed to attach directly to the associated part 66, 74 or 83. When the guide roller mount assemblies 42 are bolted into place the associated part 66, 74 or 83 in properly aligned with respect to center column 117. Mounting bracket 42 is constructed to fit machined surfaces on the part to which it is mounted. The disclosed guide roller mount 42 is easily removable, without any additional disassembly of machine 10, by removing the necessary mounting bolts. The disclosed guide roller assembly 42 provides for self alignment of the associated part 66, 74 or 83 when in place. Roller 43 fits the contour of column 117 and allows easy longitudinal movement of the upper actuator driver 74, the upper tool plate support 83 or the lower actuator driver 66, in response to the movement of associated cam follower 55.

Figure 11:
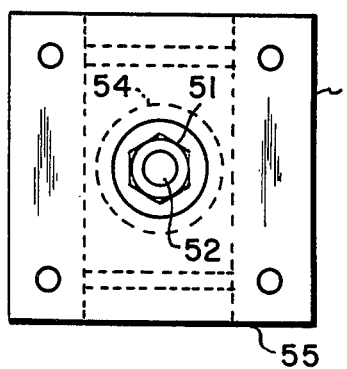
FIG. 11 is a front view of the cam roller mount utilized on the disclosed assembly machine.
Figure 12:
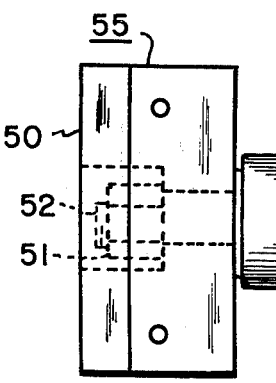
FIG. 12 is a side view of the cam roller mount shown in FIG. 11.
Figure 13:
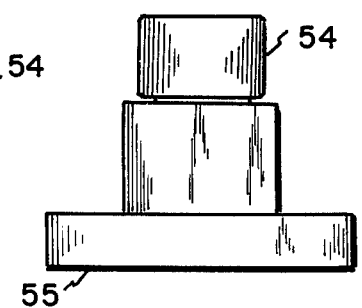
FIG 13 is a plan view of the cam roller mount shown in FIG. 11.
Figure 14:
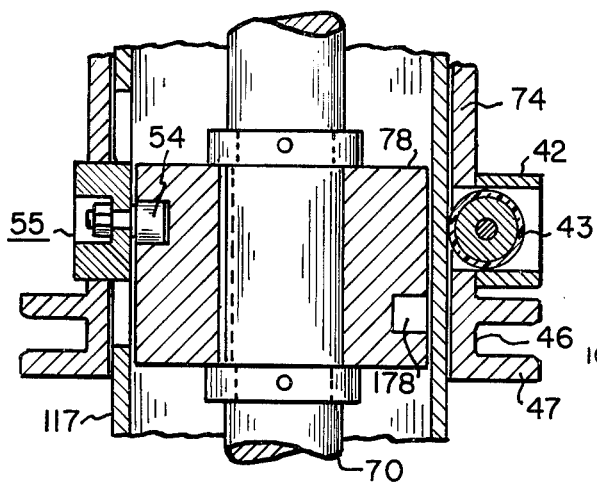
FIG. 14 is a sectional view of a portion of the assembly machine shown in FIG. 7 along lines XIV—XIV.

Cam follower assembly 55 is attached to parts 66, 74 and 83 to provide up and down reciprocating motion as shaft 70 is rotated. Construction of the cam roller assembly 55 can best be seen in FIGS. 11 to 13. Roller 54 is rotatably supported by a threaded shaft 52. Nut 51 secures the roller 54 and shaft 52 to support bracket 150. Support bracket 150 is then bolted to the upper actuator driver 74, the upper tooling plate support 83 or the lower actuator driver 66, with the roller 54 disposed in the associated cam groove 178, 184 or 167, respectively. As the main shaft 70 rotates roller 54 rides in the groove of associated cam 78, 84 or 67 and the cam follower assembly 55 moves in response to the groove position. This in turn moves the part 74, 83 or 66 to which the cam follower assembly 55 is attached. Thus the rotary motion of the main shaft 70 is changed to reciprocating motion of the upper actuator driver 74, the upper tooling support 83 and the lower actuator driver 66, all of which ride on center column 117.

Figure 21:
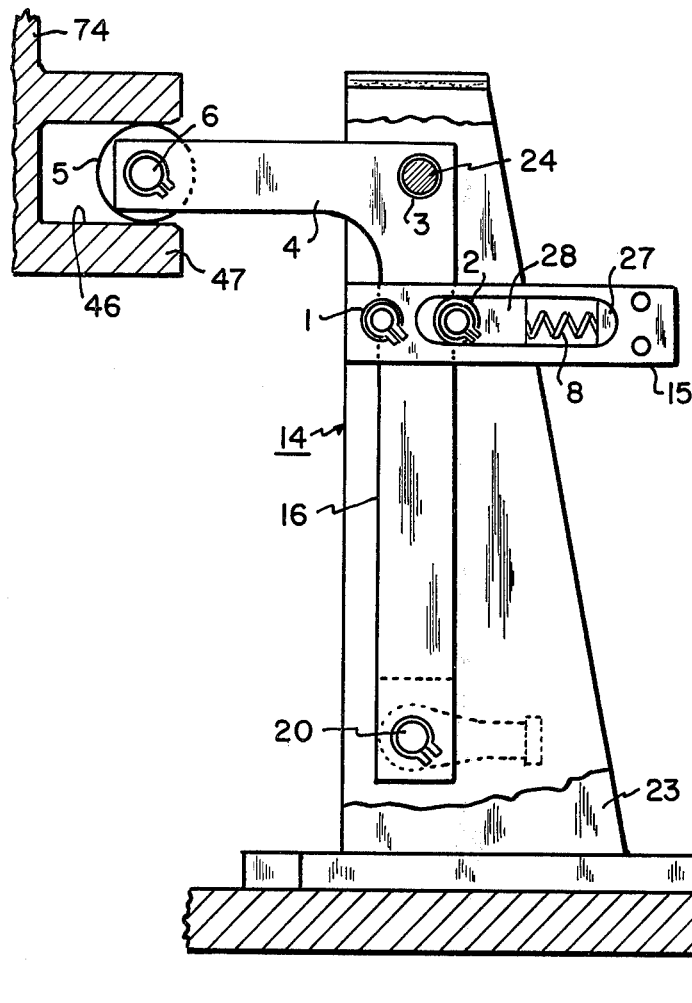
FIG. 21 is a front view of the actuator assembly with portions broken away for clarity.
Figure 22:
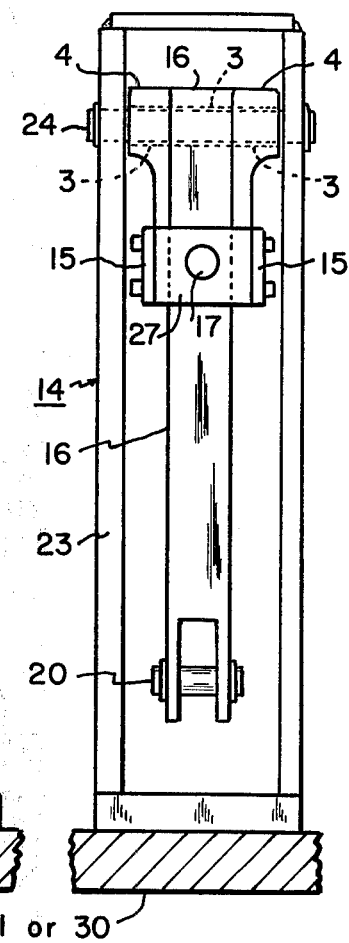
FIG. 22 is a right side view of the actuator assembly shown in FIG. 21.
Figure 23:
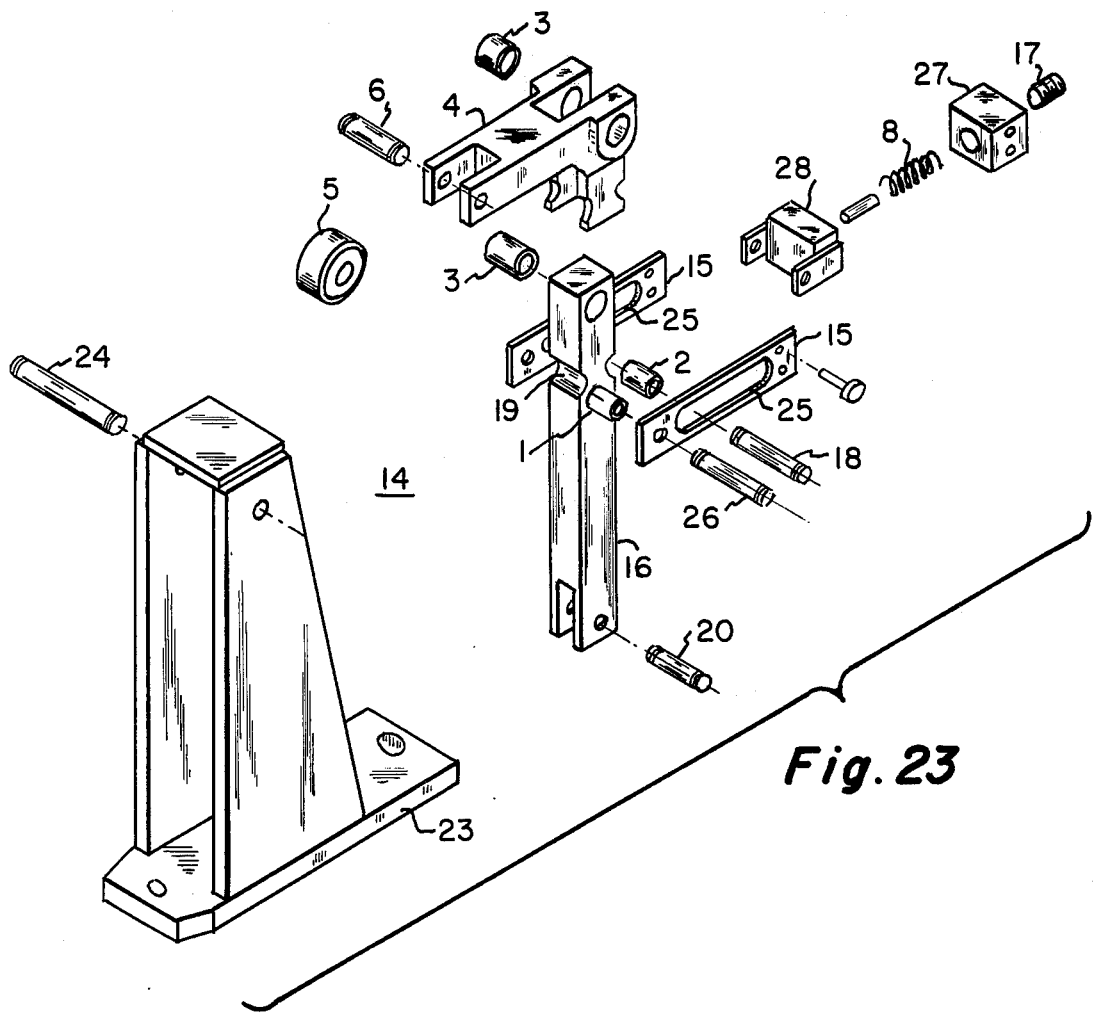
FIG. 23 is an exploded view of the disclosed actuator assembly.

The upper actuator driver 74 and the lower actuator driver 66 have U-shaped groover 46 formed in annular rings 47 which extend around their periphery. Tooling, which performs operations on devices mounted at assembly stations 64 on assembly table 65, are mounted on the upper tool plate 82 and lower tool plate 30. The desired tooling and tooling actuators can thus be mounted both above and below the rotatable assembly table 65. An actuator 14 which engages a groove 46 of the upper actuator driver 74 is mounted to the upper actuator mount 81. The actuator 14 which is shown in FIGS. 21 through 23 supplies power to tooling mounted on the upper tooling plate 82. As the upper actuator driver 74 reciprocates up and down in response to rotation of the main shaft 70, the actuator uses this motion to transmit power to tooling mounted on the upper tooling plate 82. If desired, actuator 14 can also be mounted on the lower tooling plate 30 and transmit power to tooling also mounted on plate 30. When mounted on tooling plate 30, the actuator 14 engages groove 46 formed in the lower actuator driver 66. As the lower actuator driver reciprocates up and down, this power is transmitted through actuator 14 to the associated tooling. Construction of actuator 14 which includes an overload release in either direction of movement will be described in detail hereinafter.

The apparatus to be assembled is positioned on nest or fixture 64 of assembly table 65. Assembly table 65 is then indexed around the periphery of assembly machine 10, moving the assembly fixtures from work station to work station. The work transfer system consists of a main indexing unit 98 which is powered by gear reducer 32. It will be recalled that gear reducer 32 is connected to the drive shaft 11 so as to be in synchronism with the main shaft reducer 69 and main shaft 70. The indexing unit 98 can be of any of a variety of standard indexing units which by intermittent operation move the assembly table so the device to be assembled moves from station to station. Indexer 98 is constructed so that when the input shaft 131 is moved through a 360° revolution, the output of the indexer moves with a controlled displacement motion through 45°. Index unit 98 drives index column 92 which is connected through an overload clutch device 91 to drive index gear 88. When indexer 98 rotates index gear 88 and index drive column 92, through an angle of 45°, the main gear 22 rotates annular assembly table 65, 15°. This provides for a 24 position machine which transfers the work from one work stop to the next. An assembly machine having any number of positions can be constructed as desired. This work transfer by indexer 98 is accomplished during a portion of the rotation of each revolution of main shaft 70. That is indexer 98 only activates index gear 88 for a controlled portion, for example 120° of a full 360° rotation by main shaft 70. This permits the remaining 240° revolution of the main shaft 70 to be utilized for operation on the items to be assembled at the new work position. A 15° revolution, intermittently by the assembly table 65, provides for a 24 position assembly machine 10. Main gear 22 is mounted to center column 117 by a bearing 60. Assembly table 65 is attached to and extends from the outer periphery of main gear 22 to rotate therewith. The turret cover 62 covers the exposed portion of the bearing and gear 22.

A problem frequently encountered with prior art assembly machines is that the indexing unit does not position the turret as close as desired to the work station. This can be caused for a variety of reasons, such as wear in the indexer cam or overload clutch power transmission system. If an interference is encountered during operation of the indexing unit, the overload clutch 91 will operate to move down and disconnect the index unit from the indexing gear 88 and this motion will activate overload limit switch 126. Overload limit switch 126 can be connected electrically to the controls of the assembly machine 10 so as to stop the assembly machine when a mechanical overload of the indexing unit occurs. Due to wear problems which could affect positioning of the assembly table 65, prior art assembly machines could not reliably utilize an overload clutch between the indexer 98 and the assembly table 65.

Figure 18:
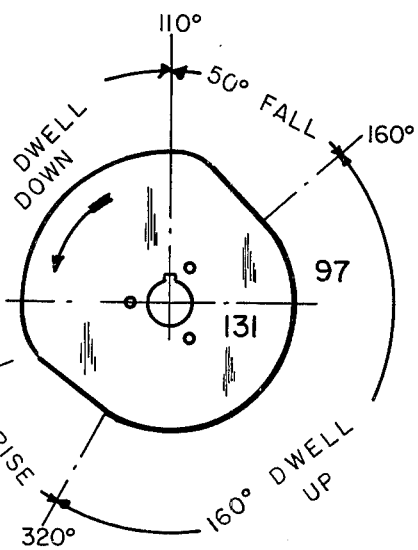
FIG. 18 is a side view of the locator drive cam.
Figures 19, 31:
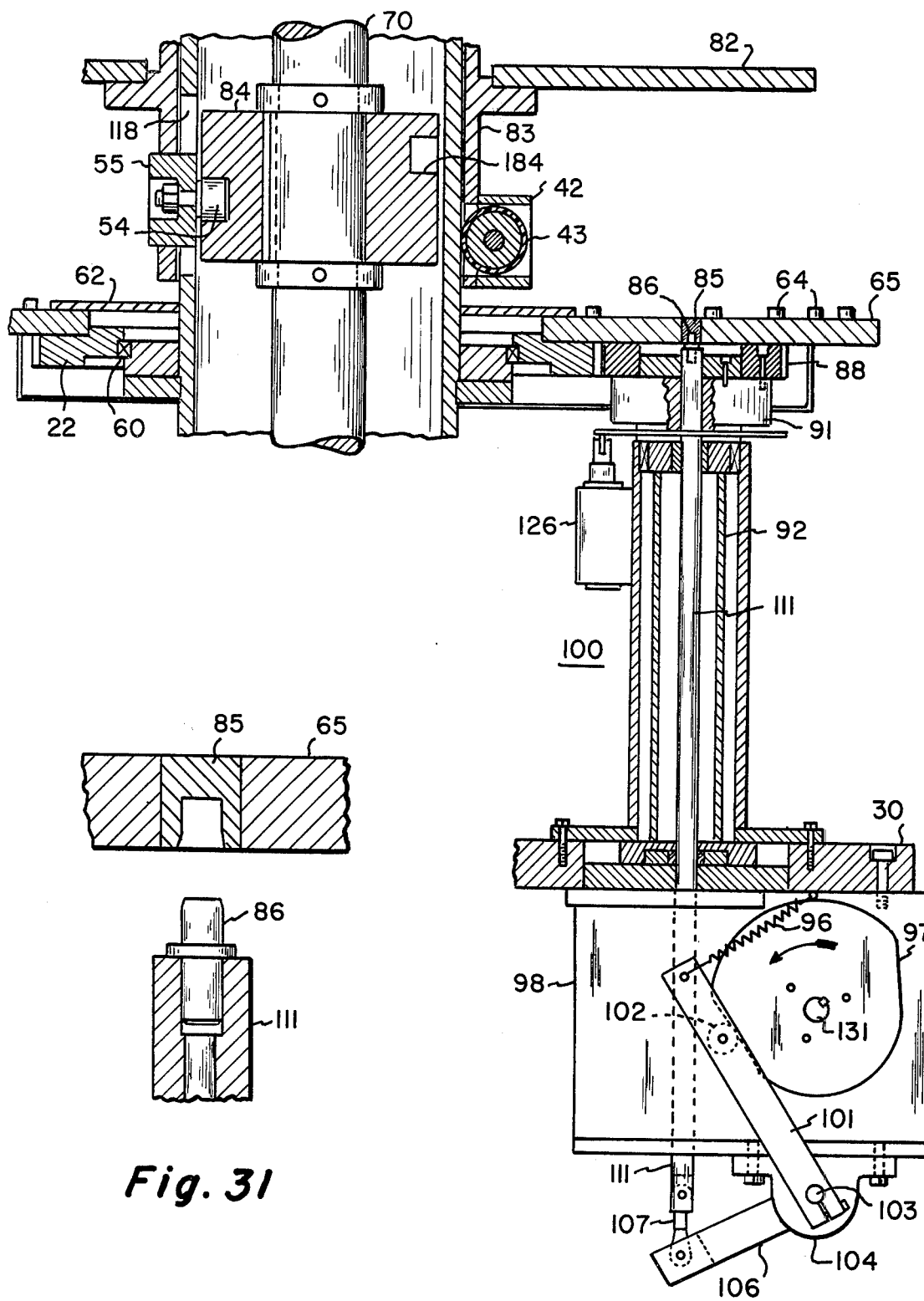
FIG. 19 is an enlargement of a portion of the assembly machine shown in FIG. 3 to more fully illustrate the indexer and the dial locating system.
FIG. 31 is an enlargement of a portion of the assembly machine shown in FIG. 3 with the locator pin disengaged and spaced apart from the locator bushing.
Figure 20:
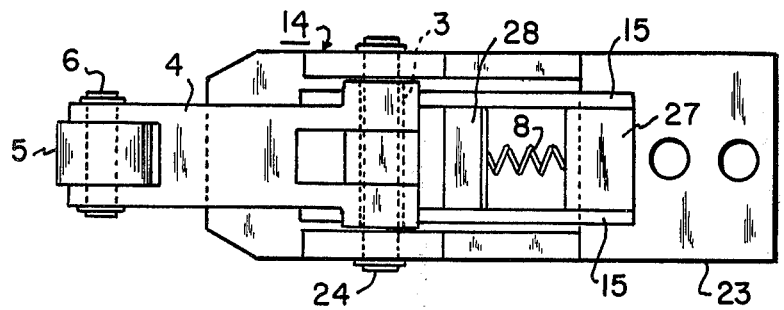
FIG. 20 is a top view of the actuator assembly.

Disclosed assembly machine 10 is provided with an assembly table locating system to very accurately position assembly table 65 each time it is indexed. This is very important since it allows for high speed accurate operations to be performed on the work piece at each assembly station. Operation of the dial or assembly table locating system can be best understood with reference to FIGS. 18, 19 and 31. A locating cam 97 is securely attached to the input shaft of indexer 98 to revolve in synchronism therewith. As cam 97 is rotated in synchronism with the input to indexer 98, cam follower 102 attached to lever 101 causes lever 101 to change position as determined by the contour of cam 97. A locator spring 96 which is connected to the outer periphery of cam 97 positively urges cam follower 102 into engagement with the outer surface of cam 97. This assures that lever 101 will faithfully follow the movement of cam 97. One end of lever 101 is securely attached to shaft 103, which passes through pillow block bearing 104 and connects to lever 106. This assures that lever 106 moves in unison with lever 001. 101. shaft 111 disposed vertically is connected by a pin to the free end of lever 106. A short rod section 107 is disposed between locator shaft 111 and the free end of lever 106 to permit some relative movement of locator shaft 111 and lever 106 without moving locator shaft 111 out of vertical alignment. Locator shaft 111 extends through the open center of index column 92. A locator pin 86 is connected to the free end of locator shaft 111. Locator shaft 111 moves up and down with a reciprocating motion in response to the action of locator cam 97. Pin 86 which is attached to the free end of locator shaft 111 engages a bushing 85 positively locating assembly table 65 at each index position. When pin 86 engages bushing 85, the assembly table can be positioned to an accuracy of 0.001 inch, and misalignments of up to 0.030 inch can be corrected. A plurality of locator bushings 85 are disposed in circular alignment around the assembly table 65 so that one can be engaged by locator pin 86 whenever the turret 65 is indexed to the next station. The number of bushings required is determined by the number of stations on the assembly table. A 24 position assembly machine will require 24 locator bushings 85. When locator pin 86 engages locator bushing 85 if the indexer 98 has not positioned turret 65 at the exact desired position, the turret 65 is moved slightly to the desired position. That is, locator pin 86 when engaging bushing 85 can move the assembly table 65 slightly so as to align the work stations at each indexing point with a very high degree of accuracy. Normally the assembly table 65 will be moved slightly at each stop. Shaft 111 is in the down position when assembly table 65 is being indexed to the next station and is raised when the index gear 88 is not being rotated indicating that assembly table 65 is near the desired index position. That is, when indexer 98 is rotating the assembly table 65 locator shaft 111 is lowered. When index column 92 stops rotating, locator shaft 111 is raised positively locating assembly table 65. Locator shaft 111 thus reciprocates in time with the index unit 98 so that the shaft is down during the index and up during the dwell portion of the machine cycle. The dial or assembly table 65 positioning system 100 utilizing the slack or backlash inherent in the gears 22 and 88 and moves the assembly table 65 slightly to a highly accurate position during the dwell portion of the machine cycle. That is, when the assembly table 65 is not being rotated locating pin 86 engages bushing 85 positioning and holding the assembly table 65 at this highly accurate predetermined position during the dwell portion of the machine cycle. The shaft moves up due to the action of spring 96 and moves down positively due to the action of cam 97. This assures positive disengagement of the locating pin 86 and the bushing 85 and provides protection in the event that assembly table 65 is out of position. Locator bushing 85 and the locator pin 86 thus provide positioning of the turret totally independent of any other positioning component of assembly machine 10. Thus, the assembly table locating system operates independently of the work transfer system provided by indexer 98 and any components which can wear such as gears, slip clutch, etc. cannot affect the positive positioning of assembly table 65. This overcomes a common problem in prior art assembly machines of this variety. FIG. 18 shows a construction of locator cam which provides for a 160° dwell position, wherein the indicator pin 86 is up and in positive engagement with the locator bushing 85. 50° of rotation are provided for each operation of raising and lowering locator shaft 111. A 100° dwell in the down position is provided. During the 100° down period the indexer 98 moves assembly table 65 to the next index station. As the locator cam 97 is further rotated the output of the indexer 98 stops and locator shaft 111 is raised, positively engaging bushing 85 disposed in the assembly table 65, for positive high accuracy positioning of assembly table 65.

Referring now to FIGS. 1 through 3, and 20 through 23, operation of the actuator 14 will be described in detail. Tooling, which is attached above and below the work stations 64 of assembly table 65 is supported on an upper tool plate 82 and a lower tooling plate 30, respectively. The actuator 14 for transferring operating power to the selected tooling is mounted to the upper actuator mount 81 or the lower tooling plate 30 as can best be seen in FIGS. 25 through 29. The cam roller 5 attached to actuator 14 engages the U-shaped slot 46 formed in the annular portion 47 of the upper actuator driver 74. As the upper actuator driver 74 reciprocates up and down, due to the movement of shaft 70, cam 78 and cam follower 55, bell crank lever 4 is moved accordingly. Roller 5 is provided to reduce wear and provide easy movement of lever 4 when the annular portion 47 moves with respect to lever 4. Roller 5 is supported on a shaft in one of the bifurcated ends of lever 4. Bell crank lever 4 has a bifurcated portion formed at its pivot point within which is disposed and pivoted a portion of lever 16. During normal operation, lever 16 moves together with bell crank lever 4. Spring clamping member 8 assures that lever 4 and lever 16 will move in unison unless an overload is reached. The free end of lever 16 is adapted to be linked to appropriate tooling so as to transmit power to the tooling. Actuator 14 can also be utilized with tooling mounted on the lower tooling plate 30. When utilized in this location, actuator 14 derives its power from the up and down reciprocating motion of U-shaped groove 46 in the lower actuator driver 66. The actuator assembly 14 transfers power from the lower actuator driver 66 or the upper actuator driver 74 to the appropriate tooling. The actuator 14 shown is a right angle assembly. However, it could very easily be used in a straight lever system or at any other desired angle. The actuator lever 4 operates in a positive manner both up and down from the movement of the appropriate actuator driver 66 or 74. Bell crank lever 4 moves every time the associated actuator driver 66 or 74 moves with respect to the associated actuator assembly 14. When a jam or overload has not occurred, the output lever 16 moves as a direct function of bell crank lever 4. The clamping force from spring 8 determines when or at what force output lever 16 will be disassociated from unitary movement with bell crank 4. As long as the load required on output lever 16 is less than the load spring 8 can restrain the lever 16 moves in synchronization with bell crank lever 4. If a load greater than that which spring 8 can withstand is applied, then spring 8 is compressed allowing independent movement of bell crank 4 and lever 16. Spring 8 can be compressed in two different situations. If the bell crank lever 4 is moving down and therefore output lever 165 is moving out from the center of assembly machine 10, and an interference is contacted, block 28 will move directly compressing spring 8. Bushing 1 will remain in contact with lever 16 and bushing 2 will move out with the free end of bell crank lever 4. Conversely, if the driver 74 controlled end of lever 4 is going up and lever 16 is coming in, then if an interference stops lever 16 from moving, bushing 1 will continue to move and bushing 2 will remain stationary, therefore compressing spring 8 from the force applied at the opposite end. The actuator not only provides overload and jam protection in both directions but also provides means to operate stops in slides to achieve their repeated accuracy.

Construction of the actuator can best be understood with reference to exploded view shown in FIG. 23. The outward extending end of the bifurcated bell crank lever 4 supports cam roller 5 connected to pin 6 which is secured to lever 4. This engages the actuator driver 66 or 74 with which the actuator assembly 14 is operating. Bell crank lever 4 is pivotally connected to housing 23 by shaft 24. Lever 16 is also pivotally connected around shaft 24. Bushings 3 are provided in the openings of levers 4 and 16 which are disposed around shaft 24 to provide for relatively easy movement. The spring loaded slide assembly is utilized for connecting levers 4 and 16 for unitary movement so long as a predetermined force applied on lever 16 is not exceeded. If an overload force is applied to lever 16 then lever 16 and lever 4 can move independently. A pair of side plates 15 are disposed around the free end of bell crank lever 4 and a portion of lever 16. Side plates 15 have elongated slots 25 formed therein. A shaft or pin 26 with a bushing 1 disposed thereon connects one end of the pair of side plates 15. The other end of the pair of side plates 15 are connected by a block 27 having a longitudinal opening therethrough in which an adjustment screw 17 is disposed. A sliding block 28 is disposed between side plates 15 engaging slots 25. Sliding block 28 has a forked end between which pin 18 and bushing 2 are supported. Sliding block 28 is urged into engagement with the free end of bell crank 4 and a portion of lever 16 by overload spring 8. The force with which sliding block 28 is forced into engagement with lever 4 and 16 is dependent on the pressure applied by spring 8 and this can be adjusted by adjusting screw 17. Thus, when the end of bell crank lever 4 containing the cam roller 5 moves in a downward motion, a force is transmitted through bushing 2, to slide block 28, through spring 8, block 27, side plates 15, to bushing 1 which engages portion 19 of lever 16. As long as a force greater than the compression force of spring 8 is not applied to lever 16, lever 16 will move backward in unison with the downward movement of the actuator end of lever 4. If an obstruction is encountered, lever 16 will stop and slide block 28 will be forced back compressing spring 8. When the end of lever 4 containing cam roller 5 is moved in an upward direction, the force will be transmitted from lever 4, through bushing 1 to side plates 15, and block 27, to spring 8 which urges sliding block 28 and bushing 2 to move lever 16. As long as lever 16 does not encounter a force greater than the compression force of spring 8, levers 4 and 16 will move in unison. If lever 16 is stopped by a force greater than the compression force of spring 8, the movement of lever 16 will be stopped, stopping slide block 28 and compressing spring 8. Thus spring 8 provides overload protection for lever 16 while moving in either direction. A pin 20 is disposed in bifurcated end of lever 16 for providing for easy connection to an associated tooling. Actuator 14 prevents damage to the tooling during an overload and also provides safety for operating personnel.

Figure 24:
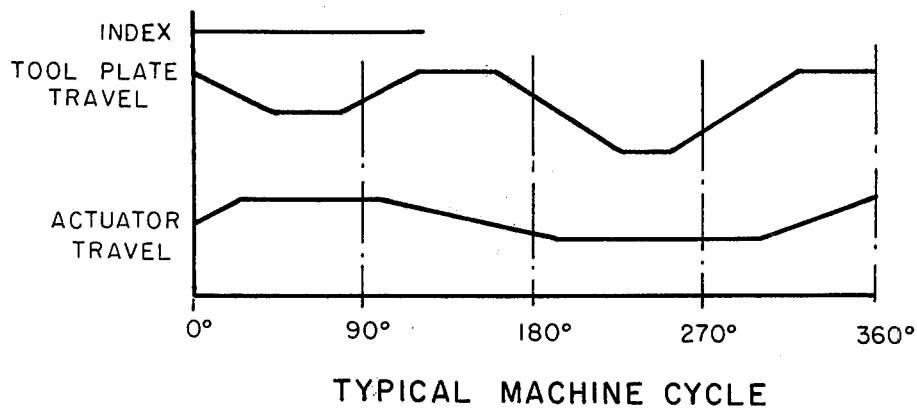
FIG. 24 is a timing graph for the disclosed assembly machine.

During normal operation of the machine, both the upper actuator driver and the upper tool plate support 83 move relative to the longitudinally fixed assembly table 65. This provides for two degrees of freedom of movement which is required for certain operations such as picking and placing. That is, tooling can be provided which will move the parts to be assembled in a longitudinally upward or downward displacement as well as a radially inward or outward displacement. To provide for power transmission through actuator 14 the upper actuator driver 74 must move relative to the upper actuator mount 81. This can be accomplished by proper selection and construction of the upper actuator cam 78 with respect to the upper tooling plate cam 84. FIG. 24 shows a diagram of tooling plate 82 movement and upper actuator driver 74 movement. An indexing step within 120° of the machine cycle is also indicated.

Numerous constructions of cams and timing of the assembly machine can be constructed as desired. Tooling operations which require only one direction of movement are particularly adaptable for being mounted on the lower tooling plate 30. Appropriate tooling mounted on the lower tooling plate 30 is powered by actuator assemblies 14 which are also mounted on the lower tooling plate 30 and receive power from the lower actuator driver 66. Mounting assembly table 65 spaced apart from the lower tooling surface 30 provides advantages in that more space is provided for mounting tooling than is provided in the prior art. Being able to mount tooling above and below the assembly table 65, on which the items to be assembled are mounted and having tooling drivers above and below the assembly table 65, permits additional tooling to be easily mounted on assembly machine 10. This provides for easy maintenance and operation of the disclosed assembly machine. Power take off from the main shaft 70 and tooling mounting, above and below the assembly table 65 is not available in some prior art assembly machines.

Figure 25:
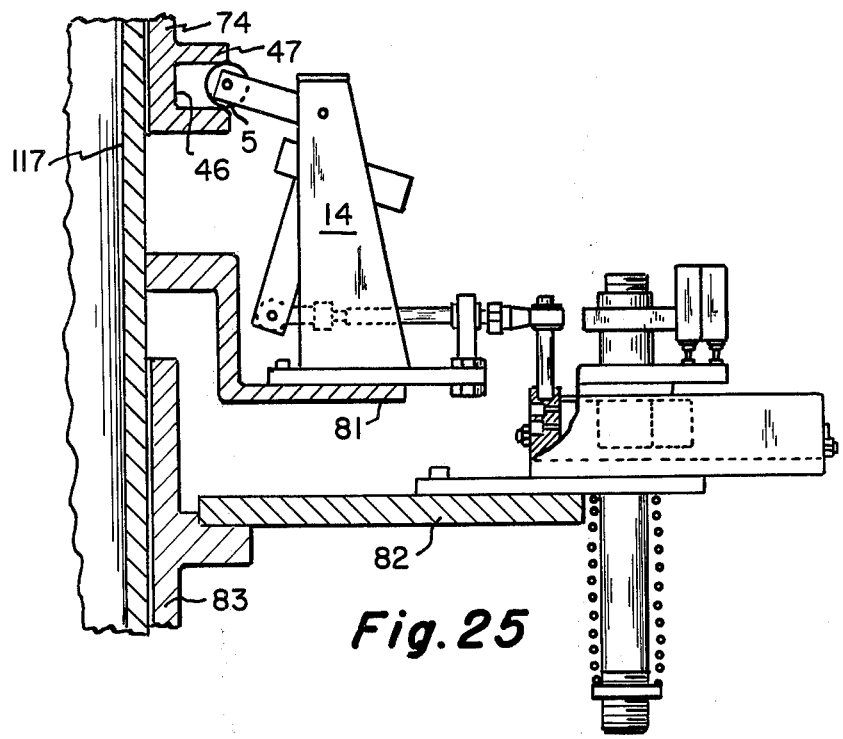
FIG. 25 is a view of a portion of the assembly machine with the actuator assembly connected for operation of a pick and place assembly.
Figure 26:
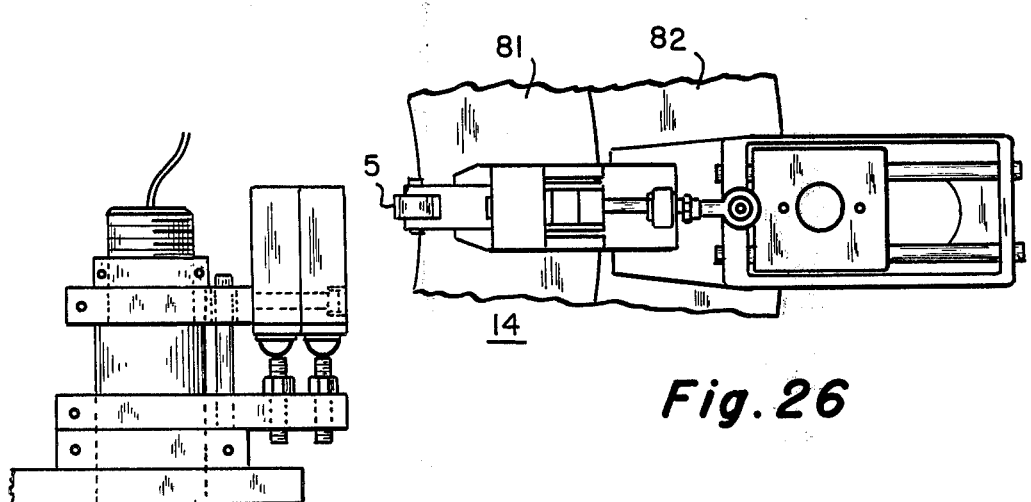
FIG. 26 is a top view of the assembly shown in FIG. 25.

Referring now to FIGS. 25 through 30 there are shown some specific examples of tooling operations with the disclosed assembly machine 10. FIGS. 25 and 26 show a pick up and place assembly which could be utilized for moving a part to be assembled onto or off of station 64 of assembly table 65. The pick up of the item to be assembled could be by vacuum, air, mechanical jaw, or any other sort of pick up device. As shown in FIG. 25 the pick and place assembly, due to the motion of the actuator driver 74, through the actuator 14, has a slide portion which moves out on a 3 inch stroke. As the upper tooling plate 82 descends on its short stroke, the assembly item is picked up from the item feeder. The short stroke of tooling plate 82 occurs during the indexing portion of the machine cycle, as is apparent from the timing diagram in FIG. 24. The upper tooling plate 82 then rises to its up position and the slide retracts to its original in position. The upper tooling plate then descends on its long stroke down placing the item on the nest or assembly station 64. During a removal operation the above described procedure is reversed and the assembly item is removed from assembly machine 10.

Figure 27:
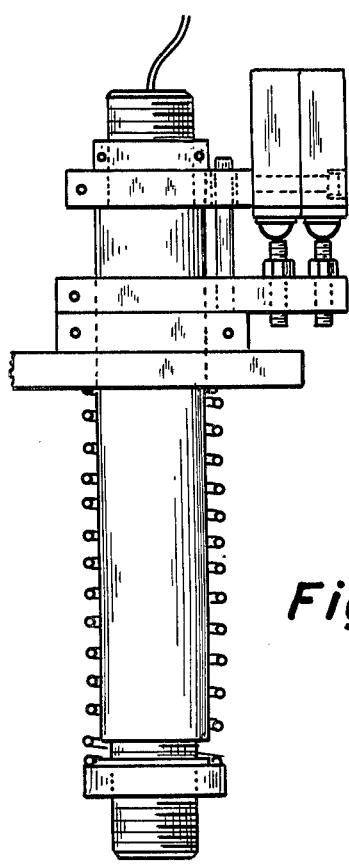
FIG. 27 is a view of an electric probe which can be utilized with the disclosed assembly machine.
Figure 30:
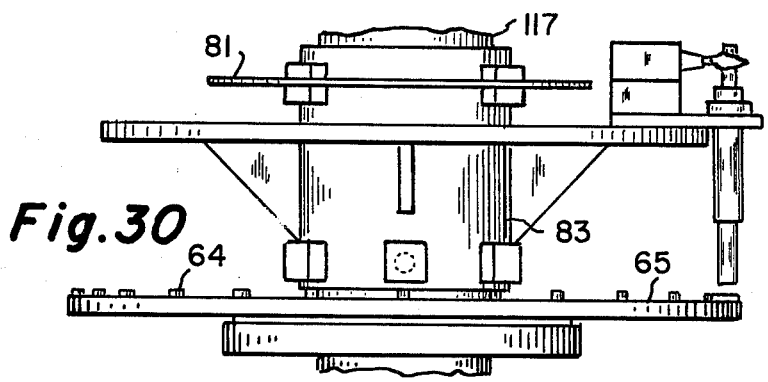
FIG. 30 is a schematic view of an electric probe operated from the upper tooling plate.

FIG. 27 shows an electric probe which can be mounted as shown in FIG. 30 for providing electrical testing or sensing of the devices being assembled. The purpose of the probe is to inspect for the presence and/or the position of an item after it has been placed at a previous work station. Then by sending a signal to the control system corrective action, if necessary can be taken. The assembly machine 10 can be stopped in the event of a negative probe and the condition corrected. Alternately, the malfunction can be noted in a shift register memory in the control system as the assembly machine 10 continues to operate and the faulty item will at some time be rejected as defective.

Figure 28:
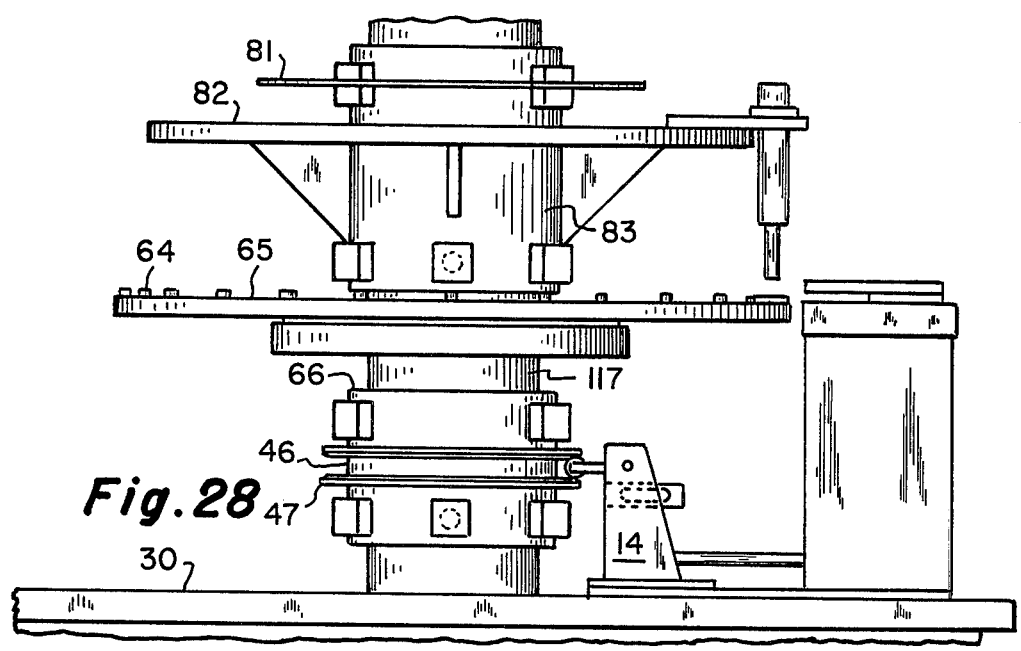
FIG 28 is a schematic view with the actuator assembly operated by the lower actuator driver for a shuttle and place operation.

FIG. 28 shows an operation of assembly machine 10 for a shuttle and place operation. The shuttle and place device is used when parts overlap on the feed track and cannot be picked directly from the end of the feeder with a pick-and-place device. In this instance the slide mounted to the lower tooling plate moves forward shuttling the part to a position underneath the pick-up head mounted to plate 82. On the short stroke down of the upper tooling plate 82 the part is picked from the end of the shuttle, the upper tooling plate then rises to its reference position, the shuttle retracts and on the long stroke down of the upper tooling plate 82 the part is placed into the nest 64 of the assembly table 65. This operation provides for pick up devices and separating parts. To assure smooth and accurate operation linear ball bearings and adjustable positive stops are provided. Overload protection is provided in both directions.

Figure 29:
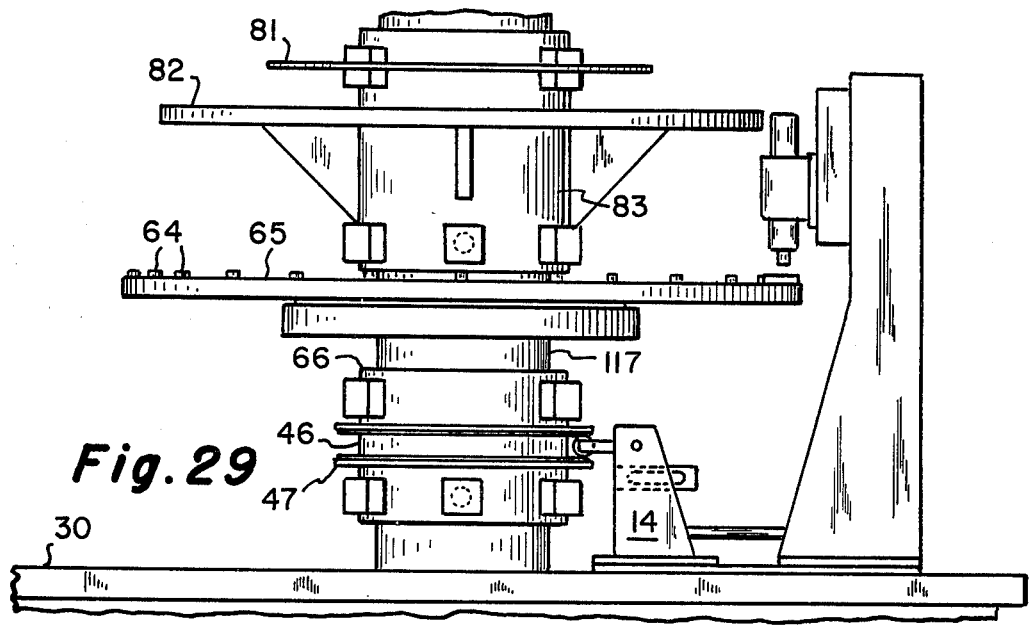
FIG. 29 is a schematic view of the actuator assembly being driven by the lower actuator driver for a process drive operation.

FIG. 29 shows a vertical process driver with the actuator and tooling supported from lower tooling plate 30. This provides motion for process equipment which requires greater dwell time such as running nuts or testing units. For example, to run a screwdriver or a welder head, etc. The motion of the lower tooling actuator driver through the actuator gives a vertical motion. The benefit of this motion and mounting is that you have a longer dwell time than attaching the tooling directly to the upper tooling plate 82.

From the above description, it can be seen that the disclosed assembly machine has significant advantages over prior art assembly machines such as: having tooling mounting surfaces above and below assembly table 65 on which the part to be assembled is indexed; a positive assembly table locating system which is independent of wear and misalignment of the main indexing system; self aligning rollers for accurately aligning the reciprocating parts with respect to the center column 117; a simple and efficient tooling actuator 14 which provides overload protection in both directions of operation; and overload protection between the indexer 98 and the assembly table 65.

What is claimed is:

1. An assembly machine for use in manufacturing an article comprising:
   a rotatable assembly table on which at least a portion of the article to be assembled can be positioned at selected locations;
   a plurality of work stops located at predetermined positions around said rotatable assembly table;
   indexing means connected to said rotatable assembly table for rotating said rotatable assembly table a predetermined distance at repeatable intervals;
   an upper tooling mount disposed above said rotatable assembly table on which tooling can be mounted;
   first tooling driver means disposed above said rotatable assembly table;
   a lower tooling mount located beneath said rotatable assembly table on which tooling can be mounted; and,
   second tooling driver means disposed between said rotatable assembly table and said lower tooling mount.

2. An assembly machine as claimed in claim 1 comprising:
   drive means for supplying power to said indexing means, said first tooling driver, and said second tooling driver;
   a main center support column;
   said rotatable assembly table disposed around and supported from said main center support column;
   said upper tooling mount disposed around and supported from said main center support column for longitudinal movement along said main center support column; and,
   said lower tooling mount disposed around said main center support column.

3. An assembly machine as claimed in claim 2 comprising:
   an upper actuator driver disposed around and supported from said main center support column above said rotatable assembly table for longitudinal movement along said main center support column;
   a lower actuator driver disposed around and supported from said main center support column beneath said rotatable assembly table for longitudinal movement along said main center support column; and
   upper actuator means connecting said upper actuator driver to tooling mounted on said upper tooling mount; and,
   lower actuator means connecting said lower actuator driver to tooling mounted on said lower tooling mount.

4. An assembly machine as claimed in claim 3 comprising:
   self aligning roller means supporting said upper actuator driver and said lower actuator driver in spaced apart relationship from said main center support column, and permitting easy longitudinal movement of said upper actuator driver and said lower actuator driver.

5. An assembly machine as claimed in claim 4 wherein:
   said self aligning roller means can be removed externally from said upper actuator driver or said lower actuator driver without disassembling the associated driver from the assembly machine.

6. An assembly machine as claimed in claim 3 wherein:
   said actuator means comprises a plurality of actuators, each disposed between one of said actuator drivers and selected tooling, movable in two directions and providing overload protection in either direction.

7. An assembly machine comprising:
   drive means;
   a main center support column;
   an annular assembly table disposed around said main center support column and being supported for relative rotary movement around the longitudinal axis of said main center support column;
   indexing means having an input driven by said drive means and an output connected to said annular assembly table for rotating said annualr assembly table to a predetermined angle at discrete spaced apart intervals;
   a lower tooling mount located beneath said annular assembly table disposed around said main center support column;
   lower actuator driver means disposed around said main center support column between said annular assembly table and said lower tooling mount for driving tooling mounted on said lower tooling mount; and,
   an upper tooling mount located above said annular assembly table disposed around and supported from said main center support column for longitudinal movement with respect to said annular assembly table.

8. An assembly machine as claimed in claim 7 comprising:
   actuator means; and
   said actuator means disposed between said drive means and said lower tooling mount and said upper tooling mount for transmitting power to tooling which can be located on said upper tooling mount and on said lower tooling mount.

9. An assembly machine as claimed in claim 8 wherein said actuator means comprises:
   a main center drive shaft disposed in said main center support column and being driven by said drive means;
   an upper actuator driver disposed around and supported from said main center support column for relative longitudinal movement along said support column;
   an upper cam connected to said main center drive shaft;
   upper cam follower means connected to said upper actuator driver to said upper cam to drive said upper actuator driver in a reciprocating motion in response to the movement of said upper cam;
   a lower cam connected to said main center drive shaft;
   a lower cam follower connecting said lower actuator driver to said lower cam for moving said lower actuator driver in a reciprocating motion in response to the movement of said lower cam;
   an upper actuator connecting said upper actuator driver to tooling located on said upper tooling mount;
   a lower actuator connecting said lower actuator driver to tooling mounted on said lower tooling mount; and wherein,
   said lower actuator driver is disposed around and supported from said main center support column for relative longitudinal movement.

10. An assembly machine as claimed in claim 9 wherein:
    said upper actuator provides for movement in two directions in response to the movement of said upper actuator driver and providing overload protection in either direction; and
    said lower actuator connecting said lower actuator driver to tooling mounted on said lower tooling mount and being movable in two directions and having overload protection in either direction.

11. An assembly machine as claimed in claim 9 comprising:
    a plurality of self aligning roller mounting means spacing said upper actuator driver, said upper tooling mount, and said lower actuator driver from said main center support column permitting relative longitudinal movement of said support items along said main center support column; and
    means for preventing relative rotary motion of said lower actuator driver, said upper actuator driver, and said upper tooling mount.

12. An assembly machine as claimed in claim 11 wherein said roller mounting means comprises:
    a plurality of rollers disposed at intervals around said upper tooling mount, said upper actuator driver, and said lower actuator driver to align and space apart associated items on the main center support column; and
    each of said rollers being removable externally from said assembling machine by only removing said roller mounting means.

13. An assembly machine comprising:
    drive means;
    a main center support column;
    an annular assembly table disposed around said main center support column and being supported for relative rotary movement around said main center support column;
    an upper tooling mount located above said annular assembly table disposed around and supported from said main center support column for relative longitudinal movement;
    actuator means disposed between said upper tooling mount and said drive means for driving said upper tooling mount in a reciprocating motion;
    a plurality of self aligning rollers disposed around said upper tooling mount to align and space apart said upper tooling mount from said main center support column; and
    each of said rollers being externally connected to said upper tooling mount to permit removal without disassembling said upper tooling mount from said main center support column.

14. An assembly machine as claimed in claim 13 comprising:
    a lower tooling mount disposed beneath said annular assembly table;
    an upper actuator driver disposed around said main center support column above said upper tooling mount and being supported for relatively reciprocating movement along the longitudinal axis of said main center support column;
    a plurality of rollers disposed around said upper actuator driver spacing apart said upper actuator driver from said main center support column; and
    said roller being supported for external removal from said upper actuator driver.

15. An assembly machine as claimed in claim 14 comprising:
    a lower actuator driver disposed around said main center support column, between said annular assembly table and said lower tooling mount, for relative longitudinal movement along the main center support column;
    a plurality of rollers disposed around said lower actuator driver spacing said lower actuator driver from said main center support column; and
    each of said rollers attached externally to said lower actuator driver.

16. An assembly machine as claimed in claim 15 comprising:
    an upper actuator connecting said upper actuator driver to tooling mounted on said upper tooling mount and providing overload disengagement in the event of an overload; and
    a lower actuator connecting said lower actuator driver to tooling mounted on said lower tooling mount and providing for disengagement in the event of an overload.

17. An assembly machine as claimed in claim 13 comprising:
    positioning means driven by said drive means for engaging and accurately positioning said assembly table between the discrete spaced apart intervals when said indexing means rotates said annular assembly table.

* * * * *

UNITED STATES PATENT AND TRADEMARK OFFICE
CERTIFICATE OF CORRECTION

PATENT NO. : 3,939,544
DATED : February 24, 1976
INVENTOR(S) : Donald S. Stevens It is certified that error appears in the above-identified patent and that said Letters Patent are hereby corrected as shown below:

Column 1, line 64, "supprt" should read --support--;

Column 6, line 54, "in" should read --is--;

Column 8, line 53, delete "001.";

Column 8, line 53, --Locator-- should be inserted after "101.";

Column 10, line 47, "165" should read --16--;

Signed and Sealed this

Sixth Day of July 1976

[SEAL]

Attest:

RUTH C. MASON
*Attesting Officer*

C. MARSHALL DANN
*Commissioner of Patents and Trademarks*